Patented May 18, 1937

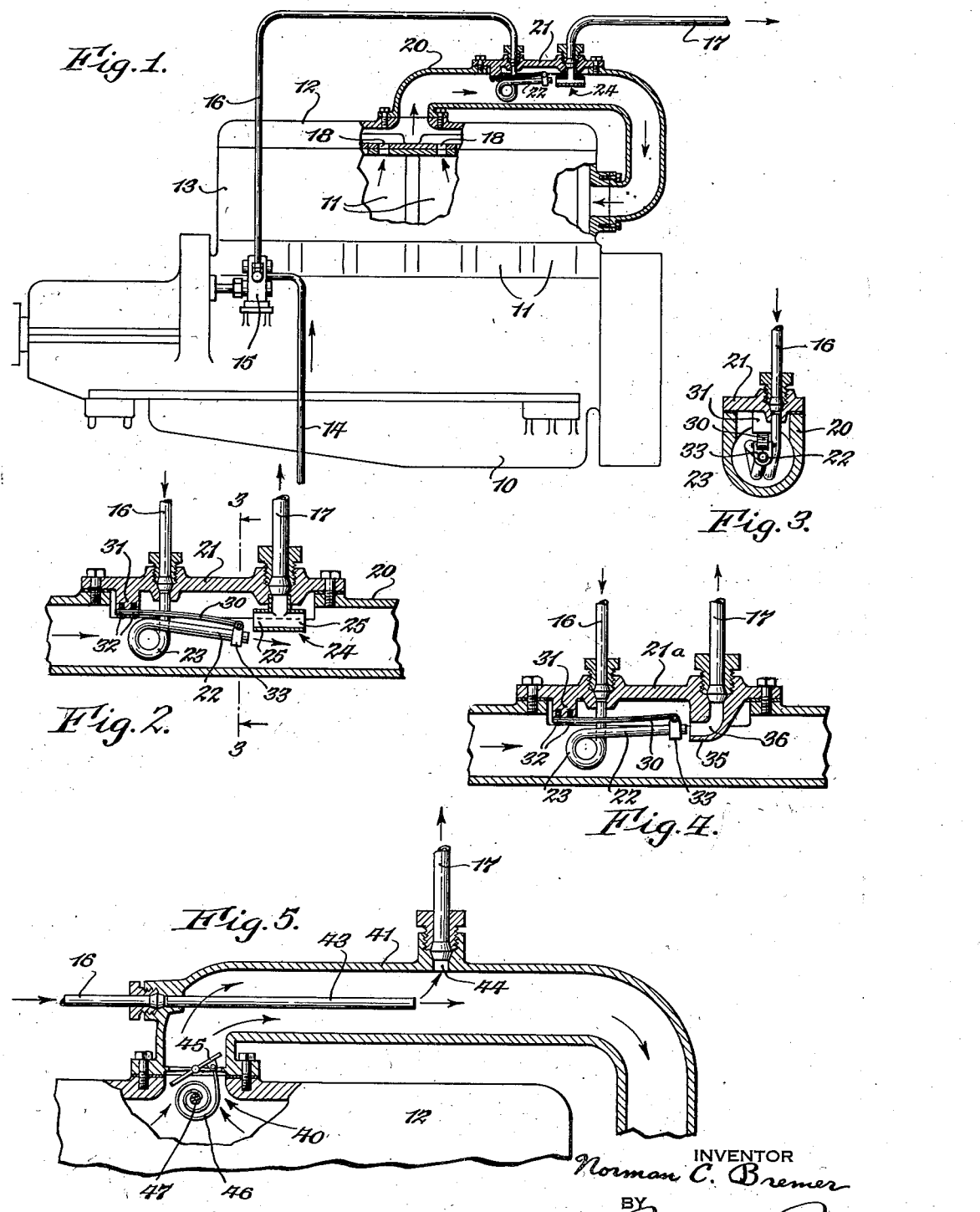

2,080,600

UNITED STATES PATENT OFFICE 2,080,600

COOLING SYSTEM FOR INTERNAL COMBUSTION MOTORS

Norman C. Bremer, Ithaca, N. Y.

Application January 28, 1935, Serial No. 3,717

18 Claims. (Cl. 123—170)

This invention relates to a cooling system for internal combustion motors and more particularly to a cooling system for marine engines where a continuous fresh supply of cooling water is used in the engine and where the initial temperature of this water supply has a wide range of variation, especially during the different seasons of the year. At present cooling water for marine engines is drawn from the body of water in which the boat is being navigated by a pump and is discharged into the water jacket forming a part of the cylinder block. The water outlet from the jacket is arranged at another point and the cooling water circulates among the cylinders during its travel from the inlet to the outlet thereby cooling the cylinder walls. However, those cylinders closest to the water inlet are necessarily cooled to a greater degree than those which are more remote and while various baffle means have been provided to insure adequate cooling of all of the cylinders uniform cooling of all of the cylinders has not been obtained. Furthermore in marine engines the temperature differential between combustion chambers and the water supply is very high and the temperature of the water supply is variable. Especially in small lakes the temperature of the water in summertime is very high and during late fall and early spring is very low. It is therefore apparent that a motor designed to operate most efficiently under one set of conditions will not operate with the same degree of efficiency during all the seasons and thus means are provided to both insure the maintenance of a constant temperature in the water circulating among the cylinders and also to prevent undue chilling of those temperatures most proximate to the water inlet.

It is the principal object of this invention to both recirculate a large volume of relatively warm water among the cylinders, mixing the incoming cold water with a part of the water heated by contact with the cylinder walls before admitting the cold water to the cylinders and also to provide automatic thermostatic control means for regulating the volume of fresh cold water which is admitted to the cylinders. These objects are accomplished in accordance with the present invention with the standard water pumps now used which are run at a constant speed or are proportionate to the speed of the engine by diverting a portion of the cold water directly to the outlet when the full quantity of cooling water is not needed. The thermostatic means are, of course, adjusted so that the cooling water flowing past the cylinder walls is maintained at a substantially constant temperature and is also so adjusted so that during starting, substantially all of the cooling water, except that required to initially fill the jacket, is diverted directly from the inlet to the outlet until the temperature of the cooling water in the jacket builds up to the desired operating temperature.

Another object of the present invention is to provide such a system which is extremely simple in construction and is composed of few parts which are not liable to get out of order and which, being free from sliding or rotating joints, could easily be coated with a corrosion resistant film, such as rubber, which would afford protection against the action of salt water.

Another purpose of the present invention is to provide such a system which can be supplied as an attachment to marine engines now in use thereby enabling the boat owners to secure more efficient operation from their engines without replacing the entire power plant.

In the accompanying drawing:

Fig. 1 is a phantom side elevation of the usual type of marine engine showing my improved cooling system in section.

Fig. 2 is a fragmentary enlarged view similar to Fig. 1 and showing in detail the manner in which the thermostatic control operates, the thermostatic control being shown in the position in which the full amount of cold water is being delivered to the cylinder walls.

Fig. 3 is a vertical section taken on line 3—3, Fig. 2.

Fig. 4 is a view similar to Fig. 2 showing a modified form of my invention.

Fig. 5 is a fragmentary view, similar to Fig. 1, showing a still further modified form of my invention.

In Fig. 1 is illustrated a marine engine of the usual and well known type, having a crank case 10, cylinders 11 and a cylinder head 12, the cylinders and cylinder head being jacketed as indicated at 13. The cooling water is obtained from the body of water in which the boat is navigated and is withdrawn through an inlet pipe 14 by a pump 15 which can be driven in any suitable manner. This pump discharges through a line 16 and in the marine motors now in use discharges directly into the jacket 13, the water, heated after passing the cylinder walls, passing out through an outlet line 17. In marine motors an equalization of the flow of water past the different cylinders is generally obtained by varying the size of apertures 18 in the walls between the cylinder head and the cylinder block. In accordance with the present invention the cooling water is admitted to and discharged from a manifold 20 having one end suitably connected to the jacket forming part of the cylinder head 12 and its other end connected to the jacket forming part of the cylinder block 13. This manifold is formed at one side to provide a large opening covered by a cover plate 21 and the inlet and outlet connections with the pipes 16 and 17, respectively, are made through this cover plate 21. The water inlet line 16 discharges into a flexible nozzle 22 which is composed of a piece of tubing bent to provide sufficient convolutions 23 to render the nozzle readily flexible, these convolutions terminating in a discharge end which is straight and projects a substantial distance outward parallel with the passage through the manifold 20.

Immediately adjacent the discharge of the nozzle 22 the outlet line 17 connects with the cover plate 21, the water passing into the outlet line first passing through an inverted T 24, the branches 25 of which are in direct alinement with the discharge end of the nozzle 22 when the nozzle 22 is in its fully elevated position, as indicated in Fig. 1.

The movement of the flexible nozzle 22 is controlled by a bimetallic thermostat element 30 which is rigidly secured at one end to a depending lug 31 on the cover plate as by screws 32 and has its free end extending along the discharge end of the flexible nozzle 22 and connected thereto by means of a clamp 33 adjacent its discharge. The form of the thermostatic element 30 is such that at low temperatures the element is unflexed in which position the discharge of the nozzle 22 is directed through the flanges 25 of the T 24 and as the temperature of the water in the jacket rises the thermostatic element flexes downwardly thereby flexing the discharge of the flexible nozzle 22 downwardly below the T 24, as illustrated in Fig. 2.

In operation it frequently happens that in starting a motor the cylinder block is only partly filled with water and inasmuch as both the engine and the cooling water, under these conditions, are cold, the flexible nozzle 22 is in the position illustrated in Fig. 1, in which the discharge of the flexible nozzle is directed through the branches of the T 24.

As the pump 15 supplies water this water is discharged through the branches 25 of the T 24 until the system is filled, after which the incoming water by-passes directly to the outlet line 17. This occurs because the water admitted to and taken from the jacket must be equal and since the entire system is filled, the incoming cold water follows the line of least resistance, passing directly from the outlet of the flexible nozzle 22 through the T 24 and out through the outlet line 17.

The water in the jacket therefore remains substantially uncirculated until its temperature rises and influences the thermostatic element 30. As this temperature rises the thermostatic element 30 gradually flexes downwardly and since this element is cantilevered it moves the discharge end of the flexible nozzle downwardly and, to a greater or less extent, out of register with the branches 25 of the T 24. In this position of the parts, a part or all of the water discharged from the flexible nozzle 22 is discharged under the T 24 and this discharge provides a jet action which creates a circulation and recirculation of the water through the jacket. Thus, the water jetting from the flexible nozzle creates a movement of the entire body of water in the jacket in the direction shown by the arrows in Fig. 1. The water issuing from the nozzle is, of course, relatively cold but in issuing from the jet a condition of turbulence is set up which causes this cold water to mix with the recirculated water before admitted to contact with any of the cylinder walls. It will therefore be seen that the thermostatic control provides a small or practically no volume of circulating water at the time when such conditions are desired, as when starting the motor or when the supply of water is extremely cold and provides a large volume of water composed of a high proportion of cold water and moving with comparatively high velocity at a time when such a condition is desirable, as when the engine is under heavy load or when the temperature of the cooling water supply is relatively high. By providing a rapid flow of a large quantity of water in the manner described the temperature differential between the water entering the jacket and leaving the jacket is relatively small and the possibility of hot and cold spots at various places throughout the engine is reduced.

It is apparent that the invention can be widely modified and still achieve the results described. For example, in Fig. 4 is illustrated a modified form of the invention in which the cover plate 21a, instead of carrying the T 24, is formed to provide a depending lug 35 which has an outlet passage 36 communicating directly with the outlet line 17. The flexible discharge nozzle shown is exactly the same as that illustrated in Figs. 1–3 and therefore the same reference numerals and description applies. The outlet of this discharge nozzle, in the elevated or "cold" position of the thermostatic element 30, is directly in line with the passage 36 and it will therefore be seen that in starting, when the motor is cold, the cold water supplied by the pump 15 is passed directly into the passage 36 and out through the line 17 without having any cooling effect upon the motor. As the engine warms up the thermostatic element 30 deflects the discharge of the flexible nozzle 22 downwardly so as to create a circulation and recirculation of the cooling water in the same manner as described with reference to Figs. 1–3.

It will also be appreciated that it is not necessary to flex the discharge nozzle of the supply line in order to secure the action desired. In Fig. 5 is illustrated a form of the invention in which the outlet opening 40 from the water jacket is connected to a manifold 41 which, similar to the manifold 20 of the forms illustrated in Figs. 1–4, has its outlet end connected with the jacket forming part of the cylinder block. The supply line 16 connects directly with that end of the manifold adjacent to the opening 40 and discharges into a tube 43 which extends parallel with the manifold so as to form a jet. The outlet of this tube or jet 43 is adjacent to the opening 44 to which the outlet line 17 is connected. A butterfly valve 45 is arranged in the opening 40 and is opened and closed by a spiral thermostatic element 46, one end of this element being fixed to a pin 47 and the other end connecting with one wing of the butterfly valve 45.

With this form of the invention, when the motor is cold the butterfly valve 45 is closed and, after filling the system, the jet 43 is substantially ineffective in creating any circulation through the cooling system inasmuch as the valve 45 is closed and prevents such circulation.

Therefore, the cold water issuing from the jet 43 flows directly through the passage 44 to the outlet line 17. As the motor warms up, the thermostatic element 46 gradually opens the butterfly valve 45 whereupon the jet 43 becomes active and effects a circulation and recirculation of water through the cooling system. The thermostatic element is set to maintain the desired operating temperature of the cooling water and opens or closes to maintain this temperature regardless of variations in the load imposed upon the motor or variations in the temperature of the cold water supply.

From the foregoing it is apparent that this invention provides a very simple, efficient and effective means of preventing a circulation of cold water when starting the motor and maintains, under all conditions of operation, the temperature of the cooling water at that best suited for efficient operation. Further, cold water is so introduced that it is mixed with warm, recirculated water before coming in contact with the cylinder walls and a large volume of water moving with comparatively high velocity is passed through the cylinder passages at a time when such conditions are desirable, as when the engine is operating under heavy load or when the temperature of the inflowing cooling water is relatively high. Further, the velocity and temperature of such cooling water and the amount of fresh cold water used in the cooling system is at all times under thermostatic control to secure the best operating conditions.

I claim as my invention:

1. A cooling system for an internal combustion engine having a water jacket, comprising a manifold having its opposite ends connected to remote parts of said jacket so as to be capable of effecting a recirculation of the water therein, a jet in said manifold disposed to direct a stream of water longitudinally of said manifold to positively effect such recirculation, means for supplying cold water to said jet, means immediately adjacent the discharge of said jet for relieving an amount of water from the recirculation system equal to the cold water delivered by said jet and thermostatic means responsive to the engine temperature for effecting a bypass of the cold water delivered by said jet directly to said outlet when the engine is cool.

2. A cooling system for an internal combustion engine having a water jacket, comprising a manifold having its opposite ends connected to remote parts of said jacket so as to be capable of effecting a recirculation of the water therein and also having an opening in one side, a cover plate over said opening, a jet carried by said cover plate and projecting into said manifold so as to direct a stream of water longitudinally of said manifold to positively effect such recirculation, means for supplying cold water to said jet, an outlet also carried by said cover plate for relieving an amount of water equal to the cold water delivered by said jet and thermostatic means responsive to the engine temperature for effecting a bypass of the cold water delivered by said jet directly to said outlet when the engine is cool.

3. Means for supplying and circulating the cooling water of an internal combustion engine having a water chamber including a water jacket and a manifold having its opposite ends connected to remote parts of said jacket so as to be capable of effecting a recirculation of the water therein, and said water chamber also having a water discharge outlet, comprising a flexible nozzle arranged to recirculate the water in said chamber and having its discharge adjacent said water discharge outlet, means for supplying cold water to said nozzle and a thermostat responsive to the temperature of the recirculating water for flexing said nozzle to deliver varying quantities of cold water against said discharge outlet thereby to vary the effective amount of cold water admitted to the chamber and the velocity of the recirculating water.

4. A cooling system for an internal combustion engine having a water jacket, comprising a manifold having its opposite ends connected to remote parts of said jacket so as to be capable of effecting a recirculation of the water therein, a flexible nozzle in said manifold and arranged to effect a recirculation of the water through said jacket and manifold, a water discharge outlet in said manifold adjacent the discharge of said nozzle, means for supplying cold water to said nozzle, a thermostat responsive to the temperature of the recirculating water for flexing said nozzle to deliver varying quantities of cold water against said discharge outlet thereby to vary the amount of cold water admitted to the system and the velocity of the recirculating water.

5. A cooling system for an internal combustion engine having a water jacket, comprising a manifold having its opposite ends connected to remote parts of said jacket so as to be capable of effecting a recirculation of the water therein and said manifold having an opening in one side, a cover plate over said opening, a flexible nozzle carried by said cover plate and arranged within said manifold so as to effect a recirculation of the water through said jacket and manifold, a water discharge outlet carried by said plate adjacent the discharge of said nozzle, means for supplying cold water to said nozzle, a thermostat carried by said plate and responsive to the temperature of the recirculating water, and means connecting said thermostat to said nozzle to flex said nozzle to deliver varying quantities of cold water against said discharge outlet thereby to vary the amount of cold water admitted to the system and the velocity of the recirculating water.

6. Means for supplying and circulating the cooling water of an internal combustion engine having a water chamber including a water jacket and a manifold having its opposite ends connected to remote parts of said jacket so as to be capable of effecting a recirculation of the water therein, and said water chamber also having a water discharge outlet, comprising a T having its base secured in said outlet and its branches arranged in said chamber, a flexible nozzle arranged to recirculate the water in said chamber and having its discharge adapted to be directed through the branches of said T, means for supplying cold water to said nozzle and a thermostat responsive to the temperature of the recirculating water for flexing said nozzle to deliver the cold water into said T or to one side of said T thereby to vary the effective amount of cold water admitted to the chamber and the velocity of the circulating water.

7. Means for supplying and circulating the cooling water of an internal combustion engine having a water chamber including a water jacket and a manifold having its opposite ends connected to remote parts of said jacket so as to be capable of effecting a recirculation of the water therein, and said water chamber also having a water discharge outlet, comprising an L connected to said outlet and having its branch directed in opposition to the flow of water through said chamber, a flexible nozzle arranged to recirculate the water in said chamber and having its discharge adapted to be directed into the branch of said L, means for supplying cold water to said nozzle and a thermostat responsive to the temperature of the recirculating water for flexing said nozzle to deliver the cold water into said L or to one side of said L thereby to vary the effective amount of cold water admitted to the chamber and the velocity of the recirculating water.

8. Means for supplying and circulating the cooling water of an internal combustion engine having a water chamber including a water jacket and a manifold having its opposite ends connected to remote parts of said jacket so as to be capable of effecting a recirculation of the water therein, and said water chamber also having a water discharge outlet, comprising a nozzle arranged to recirculate the water in said chamber and having its discharge adjacent said water discharge outlet, means for supplying cold water to said nozzle, a thermostat responsive to the temperature of the recirculating water and means responsive to said thermostat for deflecting the stream from said nozzle to deliver varying quantities of cold water against said discharge outlet thereby to vary the effective amount of cold water admitted to the chamber and the velocity of the recirculating water.

9. A cooling system for an internal combustion engine having a water jacket, comprising a manifold having its opposite ends connected to remote parts of said jacket so as to be capable of effecting a recirculation of the water therein, a nozzle in said manifold and arranged to effect a recirculation of the water through said jacket and manifold, a water discharge outlet in said manifold adjacent the discharge of said nozzle, means for supplying cold water to said nozzle, a thermostat responsive to the temperature of the recirculating water and means responsive to said thermostat for deflecting the stream from said nozzle to deliver varying quantities of cold water against said discharge outlet thereby to vary the amount of cold water admitted to the system and the velocity of the recirculating water.

10. A cooling system for an internal combustion engine having a water jacket, comprising a manifold having its opposite ends connected to remote parts of said jacket so as to be capable of effecting a recirculation of the water therein and said manifold having an opening in one side, a cover plate over said opening, a nozzle carried by said cover plate and arranged within said manifold so as to effect a recirculation of the water through said jacket and manifold, a water discharge outlet carried by said plate adjacent the discharge of said nozzle, means for supplying cold water to said nozzle, a thermostat carried by said plate and responsive to the temperature of the recirculating water, and means responsive to said thermostat for deflecting the stream from said nozzle to deliver varying quantities of cold water against said discharge outlet thereby to vary the amount of cold water admitted to the system and the velocity of the recirculating water.

11. Means for supplying and circulating the cooling water of an internal combustion engine having a water chamber including a water jacket and a manifold having its opposite ends connected to remote parts of said jacket so as to be capable of effecting a recirculation of the water therein, and said water chamber also having a water discharge outlet, comprising a T having its base secured in said outlet and its branches arranged in said chamber, a nozzle arranged to recirculate the water in said chamber and having its discharge adapted to be directed through the branches of said T, means for supplying cold water to said nozzle, a thermostat responsive to the temperature of the recirculating water and means responsive to said thermostat for deflecting the stream from said nozzle to deliver the cold water into said T or to one side of said T thereby to vary the effective amount of cold water admitted to the chamber and the velocity of the circulating water.

12. Means for supplying and circulating the cooling water of an internal combustion engine having a water chamber including a water jacket and a manifold having its opposite ends connected to remote parts of said jacket so as to be capable of effecting a recirculation of the water therein, and said water chamber also having a water discharge outlet, comprising an L connected to said outlet and having its branch directed in opposition to the flow of water through said chamber, a nozzle arranged to recirculate the water in said chamber and having its discharge adapted to be directed into the branch of said L, means for supplying cold water to said nozzle, a thermostat responsive to the temperature of the recirculating water and means responsive to said thermostat for deflecting the stream from said nozzle to deliver the cold water into said L or to one side of said L thereby to vary the effective amount of cold water admitted to the chamber and the velocity of the recirculating water.

13. A cooling system for an internal combustion engine having a water jacket circulating system and a conduit permitting a recirculation of the water through said jacket, comprising a cold water inlet jet in said conduit, means for supplying a substantially constant flow of cold water to said jet, said jet being arranged to deliver said cold water in a direction to positively recirculate the water in said jacket, a water outlet in said conduit adjacent the discharge of said jet and toward which said jet discharges, and means arranged within the water circulating system and in the path of the flow of water induced by said jet for controlling the velocity of the flow of recirculating water induced by said jet.

14. A cooling system for an internal combustion engine having a water jacket circulating system and a conduit permitting a recirculation of the water through said jacket, comprising a cold water inlet jet in said conduit, means for supplying a substantially constant flow of cold water to said jet, said jet being arranged to deliver said cold water in a direction to positively recirculate the water in said jacket, a water outlet in said conduit adjacent the discharge of said jet and toward which said jet discharges, a thermostat responsive to the temperature of the engine and means actuated by said thermostat and arranged within the water circulating system and in the path of the flow of water induced by said jet for controlling the velocity of the flow of recirculating water induced by said jet.

15. A cooling system for an internal combustion engine having a water jacket circulating system and a conduit permitting a recirculation of the water through said jacket, comprising a cold water inlet jet in said conduit, means for supplying a substantially constant flow of cold water to said jet, said jet being arranged to deliver said cold water in a direction to positively recirculate the water in said jacket, a water outlet in said conduit adjacent the discharge of said jet and toward which said jet discharges, a valve across the path of the recirculating water induced by said jet and means for actuating said valve.

16. A cooling system for an internal combustion engine having a water jacket circulating system and a conduit permitting a recirculation of the water through said jacket, comprising a cold water inlet jet in said conduit, means for supplying a substantially constant flow of cold water to said jet, said jet being arranged to deliver said cold water in a direction to positively recirculate the water in said jacket, a water outlet in said conduit adjacent the discharge of said jet and toward which said jet discharges, a valve across the path of the recirculating water induced by said jet and a thermostat responsive to the temperature of the recirculating water and opening and closing said valve to vary the velocity of the recirculating water induced by said jet.

17. Means for supplying and circulating the cooling water of an internal combustion engine having a water chamber including a water jacket and a manifold having its opposite ends connected to remote parts of said jacket so as to be capable of effecting a recirculation of the water therein and said water chamber also having a water discharge outlet, comprising a flexible nozzle arranged to circulate the water in said chamber and having its discharge adjacent said water discharge outlet, means for supplying cold water to said nozzle and means for flexing said nozzle to deliver varying quantities of cold water against said discharge outlet thereby to vary the effective amount of cold water admitted to the chamber and the velocity of the recirculating water.

18. A cooling system for an internal combustion engine having a water jacket comprising a manifold having its opposite ends connected to remote parts of said jacket so as to be capable of effecting a recirculation of the water therein, a nozzle in said manifold and arranged to effect a recirculation of the water through said jacket and manifold, a water discharge outlet in said manifold adjacent the discharge of said nozzle, means for supplying cold water to said nozzle, and means for deflecting the stream from said nozzle to deliver varying quantities of cold water against said discharge outlet thereby to vary the effective amount of cold water admitted to the system and the velocity of the recirculating water.

NORMAN C. BREMER.